(12) United States Patent
Itoh

(10) Patent No.: US 7,732,117 B2
(45) Date of Patent: Jun. 8, 2010

(54) PHOTOCATALYST COMPOSITION AND PHOTOCATALYST CONTAINING LAYER

(75) Inventor: Kiyoshi Itoh, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 579 days.

(21) Appl. No.: 11/389,976

(22) Filed: Mar. 27, 2006

(65) Prior Publication Data
US 2006/0223699 A1 Oct. 5, 2006

(30) Foreign Application Priority Data
Mar. 29, 2005 (JP) .............................. 2005-094586

(51) Int. Cl.
G03F 7/00 (2006.01)
G03F 7/004 (2006.01)
(52) U.S. Cl. .................... 430/270.1; 430/905; 430/913; 430/945
(58) Field of Classification Search ............. 430/270.1, 430/9, 311, 905, 913, 945
See application file for complete search history.

(56) References Cited
FOREIGN PATENT DOCUMENTS

| EP | 1 611 953 A1 | 1/2006 |
|---|---|---|
| JP | 09-100437 A | 4/1997 |
| JP | 10249209 | 9/1998 |
| JP | 10277400 | 10/1998 |
| JP | 11285635 | 10/1999 |
| JP | 11347418 | 12/1999 |
| JP | 2000-249821 | 9/2000 |
| JP | 2002363494 | 12/2002 |
| JP | 2003062922 | 3/2003 |
| JP | 2003-112053 A | 4/2003 |
| JP | 2004337740 | 12/2004 |

OTHER PUBLICATIONS

English language machine translation of JP 2000-249821.*

* cited by examiner

Primary Examiner—Amanda C. Walke
(74) Attorney, Agent, or Firm—Ladas & Parry LLP (57) ABSTRACT

The main object of the present invention is to provide a photocatalyst composition and a photocatalyst containing layer showing a high activity in a short period of time, and a pattern formed body using the photocatalyst containing layer.

To attain the object, the invention provides a photocatalyst composition containing at least a photocatalyst, characterized by including a portion with the signal intensity of the electron spin resonance spectrum derived from the hydroxy radical increased to 1,000 times or more in 1 second within 600 seconds of the start of the ultraviolet ray irradiation at the time of measuring the electron spin resonance spectrum while irradiating the ultraviolet ray.

6 Claims, 4 Drawing Sheets

PHOTOCATALYST COMPOSITION AND PHOTOCATALYST CONTAINING LAYER

BACKGROUND OF THE INVENTION

1. Field of the Invention

The present invention relates to a photocatalyst composition used for various applications such as patterning of an organic layer, a photocatalyst containing layer, a pattern formed body using the photocatalyst containing layer or the like.

2. Description of the Related Art

Conventionally, as a production method for a pattern formed body for forming, on a substrate, various patterns such as a graphic, an image, a character and a circuit, various methods have been proposed. For example, the planographic printing, the offset printing, the printing method for producing a planographic printing original plate using a heat mode recording material or the like is used. Moreover, the production method for a pattern formed body with photolithography by for example carrying out the pattern exposure to a photoresist layer coated on a base material, developing the photoresist after the exposure, and furthermore carrying out the etching or using a substance having the functionality with respect to the photoresist for directly forming a purposed pattern by the exposure of the photoresist or the like is also known.

However, at the time of producing a highly precise pattern formed body to be used, for example, for a color filter, the above-mentioned printing method involves a problem of the low positioning accuracy or the like, and thus it is difficult to use the same. Moreover, according to the above-mentioned photolithography method, a problem is involved in that the waste liquid should be disposed or the like. This is because the photoresist needs to be used, and the developing with the liquid developing solution and the etching need to be executed after the exposure. Moreover, in the case a functional substance is used as the photoresist, a problem of the deterioration by the alkaline solution used at the time of the development or the like is also involved.

Then, a production method for a pattern formed body which forms a pattern with the property of the photocatalyst containing layer changed by an action of the photocatalyst accompanied by the energy irradiation by forming a photocatalyst containing layer containing a photocatalyst and a binder on a base material, and carrying out the exposure from a predetermined direction or the like is proposed (Japanese Patent Application Laid-Open (JP-A) No. 2000-249821). According to the method, the property of the photocatalyst containing layer can be changed easily by the action of the photocatalyst accompanied by the energy irradiation so that a pattern formed body capable of forming a functional part utilizing the property difference can be provided. Moreover, according to the method, it is also advantageous in that a developing solution or the like needs not be used. Although the function mechanism of such a photocatalyst is not always clear, it is considered that a carrier generated by the energy irradiation changes the chemical structure of an organic substance by the direct reaction with an adjacent compound, or by an active oxygen species generated in the presence of oxygen or water.

However, depending on the kind of the above-mentioned photocatalyst containing layer, the pattern formation requires time or the like due to the low activity of the photocatalyst. Moreover, at the time, in the case the energy is irradiated to the photocatalyst containing layer for a long period of time, due to the energy spreading around or the like, the pattern is thickened so that a problem is involved in that a highly precise pattern formation is difficult or the like.

SUMMARY OF THE INVENTION

A photocatalyst composition and a photocatalyst containing layer showing a high activity in a short period of time, a pattern formed body using the photocatalyst containing layer, and the like are desired.

The present invention provides a photocatalyst composition comprising at least a photocatalyst, characterized by including a portion with the signal intensity of the electron spin resonance spectrum derived from the hydroxy radical increased to 1,000 times or more in 1 second within 600 seconds of the start of the ultraviolet ray irradiation at the time of measuring the electron spin resonance spectrum while irradiating an ultraviolet ray.

According to the present invention, since the signal intensity of the electron spin resonance spectrum derived from the hydroxy radical is increased to a predetermined value or higher within a predetermined time period from the start of the energy irradiation, the activity of the photocatalyst in the photocatalyst composition is high so that the generation efficiency of the active oxygen species in a short period of time can be made higher. Therefore, a photocatalyst composition capable of performing the photocatalyst function efficiently in a short period of time can be provided so as to be used for the various applications.

The present invention provides a photocatalyst containing layer comprising at least a photocatalyst, characterized by including a portion with the signal intensity of the electron spin resonance spectrum derived from the hydroxy radical increased to 1,000 times or more in 1 second within 600 seconds of the start of the ultraviolet ray irradiation at the time of measuring the electron spin resonance spectrum while irradiating an ultraviolet ray.

According to the present invention, since the signal intensity of the electron spin resonance spectrum derived from the hydroxy radical is increased to a predetermined value or higher within a predetermined time period from the start of the energy irradiation, the activity of the photocatalyst in the photocatalyst containing layer is high so that the generation efficiency of the active oxygen species in a short period of time can be made higher. Therefore, a photocatalyst containing layer capable of decomposing or modifying an organic substance efficiently in a short period of time can be provided so as to be used for various highly precise pattern formation.

Moreover, the present invention provides a pattern formed body characterized by comprising a base material, and the photocatalyst containing layer formed on the base material and has the property change by an action of the photocatalyst accompanied by the energy irradiation, wherein a property changeable pattern with the property of the photocatalyst containing layer changed in a pattern is provided.

According to the present invention, since the above-mentioned photocatalyst containing layer has the property change by an action of the photocatalyst accompanied by the energy irradiation, the property changeable pattern can be formed by a pattern irradiation of the energy to the photocatalyst containing layer. Moreover, at the time, since the activity of the above-mentioned photocatalyst layer is high, the property changeable pattern can be formed efficiently in a short period of time so that a pattern formed body having a highly precise property changeable pattern can be provided.

Further, the present invention provides a pattern formed body characterized by comprising a base material, the photocatalyst containing layer formed on the base material, and a property changeable layer formed on the photocatalyst containing layer and has the property change by an action of the photocatalyst accompanied by the energy irradiation, wherein a property changeable pattern with the property of the property changeable layer changed in a pattern is provided.

According to the present invention, since the above-mentioned photocatalyst containing layer is formed, the property of the property changeable pattern can be changed by the energy irradiation of the above-mentioned photocatalyst containing layer, the property changeable pattern can be formed easily without having a complicated process or the like. Moreover, at the time, since the activity of the above-mentioned photocatalyst layer is high, the property changeable pattern can be formed efficiently in a short period of time so that a pattern formed body having a highly precise property changeable pattern can be provided.

The present invention provides a photocatalyst containing layer side substrate used for forming a property changeable pattern with the property changed by an action of a photocatalyst accompanied by the energy irradiation to a counter substrate to be disposed facing thereto, characterized by comprising a base body, and the photocatalyst containing layer, formed on the base body.

According to the present invention, since the activity of the photocatalyst in the above-mentioned photocatalyst containing layer is high, in the case energy is irradiated with the photocatalyst containing layer side substrate and the counter substrate disposed facing with each other, the property of the counter substrate can be changed efficiently in a short period of time.

The present invention provides a production method for a photocatalyst containing layer, characterized by comprising an examination process for selecting only the photocatalyst containing layer including a portion with the signal intensity of the electron spin resonance spectrum derived from the hydroxy radical increased to 1,000 times or more in 1 second within 600 seconds of the start of the ultraviolet ray irradiation by measuring the electron spin resonance spectrum while irradiating an ultraviolet ray to a photocatalyst containing layer containing at least a photocatalyst.

According to the present invention, since only the photocatalyst containing layer including a portion to have the signal intensity of the electron spin resonance spectrum derived from the hydroxy radical to a predetermined value or more in a predetermined time from the start of the energy irradiation is selected, only a photocatalyst containing layer having a high activity, capable of decomposing or modifying an organic substance efficiently in a short period of time can be produced.

The present invention provides a production method for a pattern formed body for producing a pattern formed body: by disposing a counter substrate and the photocatalyst containing layer side substrate comprising a base body and a photocatalyst containing layer containing at least a photocatalyst formed on the base body, facing with each other; and by irradiating the energy in a pattern to form a property changeable pattern with the property changed on the counter substrate, characterized by comprising: an examination process for selecting only the photocatalyst containing layer side substrate including a portion with the signal intensity of the electron spin resonance spectrum derived from the hydroxy radical increased to 1,000 times or more in 1 second within 600 seconds of the start of the ultraviolet ray irradiation by measuring the electron spin resonance spectrum while irradiating an ultraviolet ray to the photocatalyst containing layer.

According to the present invention, in the above-mentioned examination process, at the time of measuring the electron spin resonance spectrum of the photocatalyst containing layer, only a photocatalyst containing layer side substrate including a portion to have the signal intensity of the electron spin resonance spectrum derived from the hydroxy radical increase to a predetermined value or more in a predetermined time from the start of the energy irradiation is selected. Therefore, according to the present invention, only the photocatalyst containing layer side substrate having a high activity of the photocatalyst can be used for the production of the pattern formed body so that a pattern formed body having a highly precise property changeable pattern can be produced efficiently in a short period of time.

According to the present invention, since the activity of the photocatalyst contained in the photocatalyst composition is high, the generation efficiency of the active oxygen species by the photocatalyst can be made higher in a short period of time. Therefore, the action of the photocatalyst can be performed efficiently in a short period of time so that the effect of providing a photocatalyst composition to be used for various applications can be achieved.

DETAILED DESCRIPTION OF THE INVENTION

The present invention relates to a photocatalyst composition used for various applications such as patterning of an organic layer and a photocatalyst containing layer, a pattern formed body using the photocatalyst containing layer or the like. Hereinafter, each will be explained independently.

A. Photocatalyst Composition

First, the photocatalyst composition of the present invention will be explained. The photocatalyst composition of the present invention is a photocatalyst composition containing at least a photocatalyst, characterized by including a portion with the signal intensity of the electron spin resonance spectrum derived from the hydroxy radical increased to 1,000 times or more in 1 second within 600 seconds of the start of the ultraviolet ray irradiation at the time of measuring the electron spin resonance spectrum while irradiating an ultraviolet ray.

When an energy is irradiated to a photocatalyst composition containing a photocatalyst in the presence of oxygen or water, an active oxygen species is generated. The active oxygen species contributes to the modification or the decomposition of an organic substance. Accordingly, a photocatalyst composition with a high photocatalyst activity and a large amount of the active oxygen species to be generated in a short period of time can efficiently exhibit the effect of the photocatalyst in a short period of time and thereby can be used for various applications such as a patterning of a layer made of an organic substance. Here, evaluation of the activity degree of the photocatalyst accompanied by the energy irradiation can be carried out by the electron spin resonance (ESR). Specifically, it can be executed by calculating the generation increasing ratio of the active oxygen species by the photocatalyst containing layer in a certain period of time by the electron spin resonance method, that is, the increasing ratio of the signal intensity of the electron spin resonance spectrum derived from the hydroxy radical. A photocatalyst composition having a higher increasing ratio can generate a larger amount of the active oxygen species in a short period of time so that it has a high photocatalyst activity.

According to the photocatalyst composition of the present invention, since a portion to have the increasing ratio in one second of the signal intensity of the electron spin resonance spectrum derived from the hydroxy radical to a predetermined value or more in a predetermined time from the start of the energy irradiation is included, the activity of the photocatalyst in a short period of time is high so that the generation efficiency of the active oxygen species by the photocatalyst is high. Therefore, by use of the photocatalyst composition of the present invention, decomposing, modifying or the like of an organic substance can be carried out efficiently in a short period of time. Accordingly, the photocatalyst composition of the present invention can be used for various applications such as patterning of a layer made of an organic substance or the like.

Here, the photocatalyst composition of the present invention preferably contains a portion with the signal intensity of the electron spin resonance spectrum derived from the hydroxy radical increased to 1,000 times or more; more preferably to 1,500 times or more; and particular preferably, to 2,000 times or more in 1 second within 600 seconds of the start of the irradiation of the energy at the time of measuring the electron spin resonance spectrum. Thereby, the activity of the photocatalyst in the photocatalyst composition can be made higher so that a photocatalyst composition capable of efficiently decomposing and the like the organic substance in a short period of time can be provided. The portion to have the increasing ratio of the signal intensity in one second to the value or more may be included by at least one point within 600 seconds.

It is preferable that the portion to have the increasing ratio of the signal intensity to the value or more is included within 600 seconds of the start of the energy irradiation; more preferably, within 300 seconds; and particular preferably within 100 seconds. Thereby, the photocatalyst composition can be activated earlier.

Here, the increasing ratio of the signal intensity can be measured and calculated by the following method. First, the photocatalyst composition and a radical trapping agent are set in an electron spin resonance measuring device. At the time, the radical trapping agent is added highly excessively with respect to the amount of the active oxygen species generated by the action of the photocatalyst by the energy irradiation. Subsequently, measurement of the electron spin resonance is started, while also starting the energy irradiation to the photocatalyst composition simultaneously. Thereafter, while irradiating the energy to the photocatalyst composition for a certain period of time, the electron spin resonance spectrum is measured in real-time so as to calculate the increasing ratio of the signal intensity in one second from the obtained data.

The radical trapping agent used for the above-mentioned measurement can be suitably selected according to the nature, or the like of the photocatalyst composition. For example, it may be provided as an aqueous solution, a powder, or the like. As such a radical trapping agent, those commonly used as a radical trapping agent such as a pyrrolin oxide can be used.

Moreover, the energy used at the time of the above-mentioned measurement may be an energy capable of exciting the photocatalyst in the photocatalyst composition so that it can be suitably selected according to the kind of the photocatalyst. As such an energy, in general, it is set in a range of 400 nm or less, preferably in a range of 150 nm or more and 380 nm or less. As it will be described later, since the photocatalyst used preferably for the photocatalyst composition is a titanium dioxide, and a light beam of the above-mentioned wavelength is preferable as the energy for activating the photocatalyst function by the titanium oxide. As the light source to be used for the energy irradiation, for example, various light sources such as a mercury lamp, a metal halide lamp, a xenon lamp, and an excimer lamp can be presented. Moreover, the energy intensity is maintained at a constant level during the above-mentioned measurement.

Here, the photocatalyst composition mentioned above is not particularly limited as long as it contains a photocatalyst. For example, it may comprise a photocatalyst alone, a photocatalyst and various kinds of additives, or the like. Moreover, the nature is not particularly limited either. For example, it may be powdery, one dispersed in a liquid, a solution or the like.

In the present invention, as the method for having the increasing ratio of the signal intensity of the electron spin resonance spectrum derived from the hydroxy radical of the photocatalyst composition to the value or more, for example, a method of improving the photocatalyst activity of the photocatalyst surface by adding a photocatalyst activity improving additive into the photocatalyst composition, a method of efficiently generating the active oxygen species by having the dispersion property of the photocatalyst in the photocatalyst composition favorably, or the like can be presented.

As the photocatalyst activity improving additive, for example, an oxide or a chloride of a metal, a sulfate, a sulfated substance, a nitrified substance, an organic acid salt, or the like can be presented. More specifically, a tin oxide, an iron chloride, a zinc nitrate, a silver acetate, or the like can be presented.

Moreover, as a method for improving the dispersion property of the photocatalyst in the photocatalyst composition, the following methods can be cited as examples: a method for improving the dispersion property by utilizing the electric repulsive force between the photocatalyst particles by providing the liquid property acidic at the time of producing the photocatalyst composition; a method of adding a dispersing agent or an aggregating agent for preventing aggregation of the photocatalyst; a method of agitating and dispersing under a certain condition for homogeneously dispersing each component; and a method of preventing aggregation by providing the binder component surrounding the photocatalyst bulky.

Here, as the photocatalyst used for the photocatalyst composition those known as photo semiconductors, for example a titanium dioxide ($TiO_2$), a zinc oxide (ZnO), a tin oxide ($SnO_2$), a strontium titanate ($SrTiO_3$), a tungsten oxide ($WO_3$), a bismuth oxide ($Bi_2O_3$), and an iron oxide ($Fe_2O_3$) can be presented. Apart from the semiconductors, metallic complex, a silver and the like can also be used. One or two or more kinds as a mixture can be selected and used from them.

In the present invention, a titanium dioxide can be used preferably. The titanium dioxide is advantageous since it has high band gap energy, chemically stable without the toxicity, and easily obtainable. The titanium dioxides include those of the anatase type and the rutile type. In this invention, either one can be used, however, it is preferable to use the anatase type titanium dioxide. The anatase type titanium dioxide has a 380 nm or less excitation wavelength.

As the anatase type titanium dioxide, for example, a hydrochloric acid deflocculation type anatase type titania sol (STS-02 (average particle diameter 7 nm) manufactured by ISHIHARA SANGYO KAISHA, LTD., ST-K01 manufactured by ISHIHARA SANGYO KAISHA, LTD.), or a nitric acid deflocculation type anatase type titania sol (TA-15 (average particle diameter 12 nm) manufactured by Nissan Chemical Industries, Ltd.) can be presented.

Moreover, a smaller particle size of the photocatalyst is preferable. The average particle size is preferably 50 nm or less, and it is particularly preferable to use a photocatalyst of 20 nm or less. As mentioned above, with a smaller particle size of the photocatalyst, the specific surface area of the photocatalyst in the photocatalyst composition can be made larger so that the intensity increasing ratio of the above-mentioned electron spin resonance spectrum can be made higher.

B. Photocatalyst Containing Layer

Next, the photocatalyst containing layer of the present invention will be explained. The photocatalyst containing layer of the invention comprising at least a photocatalyst, characterized by including a portion with the signal intensity of the electron spin resonance spectrum derived from the hydroxy radical increased to 1,000 times or more in 1 second within 600 seconds of the start of the ultraviolet ray irradiation at the time of measuring the electron spin resonance spectrum while irradiating the ultraviolet ray.

In the present invention, a portion with the intensity increasing ratio of the electron spin resonance spectrum derived from the hydroxy radical to a predetermined value or more in 1 second within a predetermined time of the start of the irradiation of the energy at the time of measuring the electron spin resonance spectrum of the photocatalyst containing layer by irradiating the layer with the energy is included. Therefore, the activity of the photocatalyst contained in the photocatalyst containing layer is high so that the generation efficiency of the active oxygen species in a short period of time is high. Accordingly, by use of the photocatalyst containing layer of the present invention, decomposing, modifying or the like of an organic substance can be carried out efficiently in a short period of time. Thus, the photocatalyst of the present invention can be used for various applications such as patterning of a layer made of an organic substance.

Here, the photocatalyst containing layer of the present invention preferably contains a portion with the signal intensity of the electron spin resonance spectrum derived from the hydroxy radical increased to 1,000 times or more; more preferably to 1,500 times or more; particular preferably, to 2,000 times or more in 1 second within 600 seconds of the start of the irradiation of the energy at the time of measuring the electron spin resonance spectrum. Thereby, the activity of the photocatalyst in the photocatalyst containing layer can be made sufficiently high so that a photocatalyst containing layer capable of efficiently decomposing and the like the organic substance in a short period of time can be provided. The portion to have the increasing ratio of the signal intensity in one second to the value or more may be included by at least one point within 600 seconds.

It is preferable that the portion to have the increasing ratio of the signal intensity to the value or more is included within 600 seconds of the start of the energy irradiation; more preferably, within 300 seconds; and particular preferably within 100 seconds. Thereby, the photocatalyst containing layer can be activated earlier.

Here, since the calculation method for the above-mentioned intensity increasing ratio is same as the method explained in the item of the above-mentioned "A. Photocatalyst composition", detailed explanation is omitted here. According to the above-mentioned electron spin resonance method, the activity of the photocatalyst in a film state in the photocatalyst containing layer can be measured. Thus, it is advantageous in that the activity of the photocatalyst can be measured in the same condition as in the case of actually using the photocatalyst containing layer, for example, for patterning a layer made of an organic substance or the like.

Here, as the method for having the increasing ratio of the signal intensity of the electron spin resonance spectrum derived from the hydroxy radical of the photocatalyst containing layer to the value or more the following methods can be cited as examples: a method of improving the photocatalyst activity of the photocatalyst surface by adding a photocatalyst activity improving additive into the photocatalyst containing layer; and a method of efficiently generating the active oxygen species by having the dispersion property of the photocatalyst in the photocatalyst containing layer favorably. As for the photocatalyst activity improving additive and the method to improve the dispersion property, those explained above in the item of the "A. Photocatalyst composition" can be used, thus a detailed explanation is omitted here.

Moreover, the photocatalyst containing layer as mentioned above may be one containing at least a photocatalyst. It may comprise a photocatalyst alone, or a photocatalyst and a binder. The photocatalyst contained in the photocatalyst containing layer is same as that explained in the item of the above-mentioned "A. Photocatalyst composition".

Moreover, as the method for forming a photocatalyst containing layer comprising only a photocatalyst, for example, a sputtering method, a CVD method, and a method of using a vacuum film production method such as a vacuum deposition method can be presented. By forming the photocatalyst containing layer by the vacuum film production method, a photocatalyst containing layer containing only a photocatalyst can be provided as an even film.

As the method for forming a photocatalyst containing layer comprising only a photocatalyst, for example, when the photocatalyst is a titanium dioxide, a method of forming an amorphous titania on the base material and then having the phase change by baking to the crystalline titania, or the like can be presented. The amorphous titania used here can be obtained for example, by the hydrolysis and dehydration condensation of an inorganic salt of a titanium such as a titanium tetrachloride and a titanium sulfate, and hydrolysis and dehydration condensation of an organic titanium compound such as a tetraethoxy titanium, a tetraisopropoxy titanium, a tetra-n-propoxy titanium, a tetrabutoxy titanium and a tetramethoxy titanium in the presence of an acid. Then, it can be modified into an anatase type titanium by baking at 400° C. to 500° C., and into a rutile type titanium by baking at 600° C. to 700° C.

On the other hand, in the case of using a binder for the photocatalyst containing layer, it is preferable that the principal skeleton of the binder has a high bonding energy not to be decomposed by the photo excitation of the above-mentioned photocatalyst. For example, an organopolysiloxane or the like can be presented.

In the case of using an organopolysiloxane as the binder, the photocatalyst containing layer can be formed by preparing a coating solution by dispersing a photocatalyst and an organopolysiloxane as the binder in a solvent as needed with other additives, and coating the coating solution on a base material. As the solvent to be used, an alcohol based organic solvent such as an ethanol and an isopropanol is preferable. The coating operation can be carried out by a known coating method such as spin coating, spray coating, dip coating, roll coating and bead coating. When an ultraviolet ray curable type component is contained as the binder, the photocatalyst containing layer can be formed by carrying out the curing process by irradiating an ultraviolet ray.

Moreover, as the binder, an amorphous silica precursor can be used. The amorphous silica precursor, represented by a general formula $SiX_4$, is preferably a silicon compound, wherein X is a halogen, a methoxy group, an ethoxy group, an acetyl group or the like, a silanol as a hydrolyzed product thereof, or a polysiloxane having an average particle weight of 3,000 or less.

Specifically, a tetraethoxy silane, a tetraisopropoxy silane, a tetra-n-propoxy silane, a tetrabutoxy silane, a tetramethoxy silane or the like can be presented. Moreover, in this case, by homogeneously dispersing the precursor of the amorphous silica and the photocatalyst particles in a non water based solvent, hydrolyzing with the water content in the air so as to form a silanol on the base material, and carrying out the dehydration polycondensation at a room temperature, the photocatalyst containing layer can be formed. By carrying out the dehydration polycondensation of the silanol at 100° C. or higher, the polymerization degree of the silanol can be increased so that the strength of the film surface can be improved. Moreover, these binding agents can be used alone or as a mixture of two or more kinds.

The content of the photocatalyst in the photocatalyst containing layer in the case of using a binder is 5 to 80% by weight, and it can be set preferably in a range of 20 to 70% by weight.

Other than the photocatalyst and the binder, surfactant can be included in the photocatalyst containing layer. Specifically, hydrocarbons of the respective series of NIKKO L BL, BC, BO, and BB manufactured by Nikko Chemicals Co., Ltd., and fluorine base or silicone base nonionic surfactants such as ZONYL FSN and FSO manufacture by Du Pont Kabushiki Kaisha, Surflon S-141 and 145 manufactured by ASAHI GLASS CO., LTD., Megaface F-141 and 144 manufactured by DAINIPPON INK AND CHEMICALS, Inc., FTERGENT F-200 and F251 manufactured by NEOS, UNIDYNE DS-401 and 402 manufactured by DAIKIN INDUSTRIES, Ltd., and Fluorad FC-170 and 176 manufactured by 3M can be cited. Furthermore, cationic surfactants, anionic surfactants and amphoteric surfactants can be used.

Other than the surfactants, oligomers and polymers such as polyvinyl alcohol, unsaturated polyester, acrylic resin, polyethylene, diallylphthalate, ethylene propylene diene monomer, epoxy resin, phenol resin, polyurethane, melamine resin, polycarbonate, polyvinyl chloride, polyamide, polyimide, styrene-butadiene rubber, chloroprene rubber, polypropylene, polybutylene, polystyrene, polyvinyl acetate, polyester, polybutadiene, polybenzimidazole, polyacrylonitrile, epichlorohydrine, polysulfide, polyisoprene and the like can be included in the photocatalyst containing layer.

Furthermore, in addition to the photocatalyst, binder and surfactant, the photocatalyst containing layer may contain a metal salt such as an iron chloride, a copper nitrate, a tin oxide and a silver acetate, a metal oxide, metal fine particles of gold, silver, copper, iron, or the like, and an ultraviolet ray absorbing pigment such as a triazol.

C. Pattern Formed Body

Next, the pattern formed body of the present invention will be explained. The pattern formed body of the present invention includes two embodiments according to the layer configuration. Hereinafter, each embodiment will be explained in detail.

1. First Embodiment

First, the pattern formed body of the first embodiment in the present invention will be explained. The pattern formed body of the embodiment is a pattern formed body characterized by comprising a base material, and the photocatalyst containing layer formed on the base material and has the property change by the action of the photocatalyst accompanied by the energy irradiation, wherein a property changeable pattern with the property of the photocatalyst containing layer changed in a pattern is provided.

Figure 1:
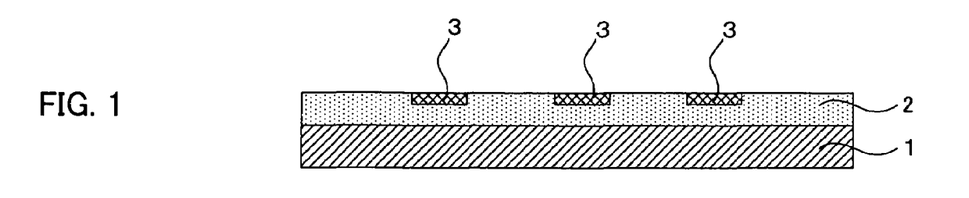
FIG. 1 is a schematic cross-sectional view showing an example of a pattern formed body of the present invention.

For example as shown in FIG. 1, the pattern formed body of this embodiment comprises a base material 1, and a photocatalyst containing layer 2 formed on the base material 1 and has the property change by the action of the photocatalyst accompanied by the energy irradiation, with a property changeable pattern 3 with the property changed formed on the photocatalyst containing layer 2.

According to this embodiment, since the above-mentioned photocatalyst containing layer has the property change by the action of the photocatalyst accompanied by the energy irradiation, the above-mentioned property changeable pattern can be formed by irradiating the energy in a pattern to the photocatalyst containing layer without the need of a complicated process or the like.

Conventionally, at the time of forming a property changeable pattern utilizing the action of the photocatalyst accompanied by the energy irradiation as mentioned above, due to the low activity of the photocatalyst, in the case the energy is irradiated for a long period of time, the pattern is thickened by the energy spreading around or the like. Accordingly, from time to time, a highly precise pattern cannot be formed. However, in this embodiment, since the activity of the photocatalyst in the photocatalyst containing layer is high, the property changeable pattern can be formed highly precisely and efficiently in a short period of time. Therefore, a high quality pattern formed body which has a highly precise property changeable pattern formed without thickening of the pattern of the property changeable pattern or the like can be provided.

Hereinafter, the pattern formed body of this embodiment will be explained in detail for each configuration.

a. Photocatalyst Containing Layer

First, the photocatalyst containing layer used in this embodiment will be explained. The photocatalyst containing layer used in this embodiment is the photocatalyst containing layer explained in the item of the above-mentioned "B. Photocatalyst containing layer" formed on the base material so as to have the property change by the action of the photocatalyst accompanied by the energy irradiation. Moreover, a property changeable pattern with the property changed in a pattern is formed on the photocatalyst containing layer surface.

Here, the above-mentioned "property change by the action of the photocatalyst accompanied by the energy irradiation" denotes the property change of the surface by decomposing, modifying or the like an organic group of the surface by the active oxygen species or the like generated by the action of the photocatalyst at the time of irradiating the energy to the photocatalyst containing layer. The kind of the property change of the photocatalyst containing layer in this embodiment is not particularly limited. For example, it may be the wettability change by decomposing, modifying or the like an organic group present on the surface of the photocatalyst containing layer, or the bonding property change of the surface of the photocatalyst containing layer.

In this embodiment, among the above-mentioned, it is particularly preferable that the photocatalyst containing layer is a layer to have the contact angle with respect to a liquid of the surface lowered by the action of the photocatalyst accompanied by the energy irradiation. Thereby, a functional part can be formed highly precisely along the property changeable pattern, utilizing the wettability difference between the property changeable pattern and the other portion.

In the photocatalyst containing layer to have the property change by the action of the photocatalyst accompanied by the energy irradiation, as the binder for the above-mentioned photocatalyst containing layer, a material to have the property change by the action of the photocatalyst or the like can be used. As such a binder, those having a high bonding energy not to have the principal skeleton of the binder decomposed by the photo excitation of the above-mentioned photocatalyst are preferable. For example, an organopolysiloxane or the like having a fluoroalkyl group disclosed in JP-A No. 2000-249821 can be used.

Figure 2A:
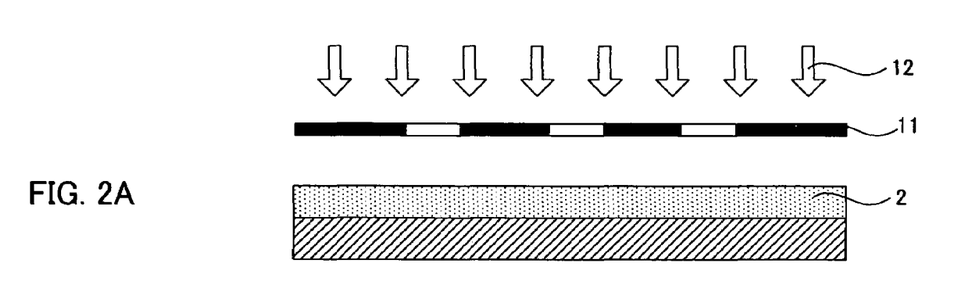
FIGS. 2A to 2B are a process diagram showing an example of a production method for a pattern formed body of the present invention.
Figure 2B:
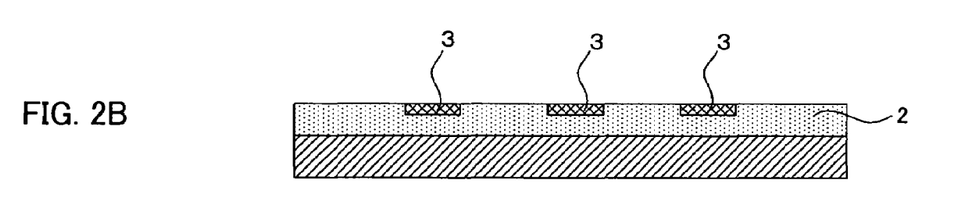

Moreover, for example as shown in FIGS. 2A to 2B, as the method for forming the above-mentioned property changeable pattern, a method of irradiating the energy 12 in a pattern using such as a photo mask 11 or the like to the above-mentioned photocatalyst containing layer 2 (FIG. 2A) for changing the property of the photocatalyst containing layer 2 for forming a property changeable pattern 3 can be presented (FIG. 2B).

The energy irradiation (exposure) in the present embodiment is the concept including the irradiation of any energy line capable of changing the property of the photocatalyst containing layer surface, and it is not limited to the irradiation of the visible light beam.

A wavelength of the light used in general for energy irradiation is set in a range of 400 nm or less, preferably in a range of 150 nm or more to 380 nm or less. This is because, as mentioned above, a preferable photocatalyst used in the photocatalyst containing layer is the titanium dioxide and it is preferable to use the light of the above wavelength as energy to activate the photocatalyst action with the titanium dioxide.

As for the light source that can be used for such an energy irradiation, various light sources such as a mercury lamp, a metal halide lamp, a xenon lamp, and an excimer lamp can be cited. Moreover, in addition to the method by the pattern irradiation via a photo mask using a light source as mentioned above, a method of graphic irradiation in a pattern using a laser beam such as excimer and YAG can also be used.

Moreover, the direction of irradiating the above-mentioned energy may either be from the base material side or from the photocatalyst containing layer side in the case the base material to be described later is transparent. On the other hand, in the case where the base material is not transparent, the energy irradiation should be carried out from the photocatalyst containing layer side.

The energy irradiation amount at the time of forming the above-mentioned property changeable pattern is the irradiation amount necessary for changing the property on the surface of the photocatalyst containing layer. In this embodiment, since the activity of the above-mentioned photocatalyst is high, the above-mentioned property changeable pattern can be formed in a short period of time.

Moreover, at the time, by irradiating the energy while heating the photocatalyst containing layer, the sensitivity can further be raised to that the property can be changed efficiently, and thus it is preferable. Specifically, it is preferable to heat in a range of 30° C. to 80° C.

b. Base Material

Next, the base material to be used for the pattern formed body of this embodiment will be explained. The base material used in this embodiment can be selected suitably according to the application of the pattern formed body, the direction of irradiating the above-mentioned energy or the like. Specifically, a transparent rigid material without flexibility, such as a quartz glass, a pyrex (registered trademark) glass, and a synthetic quartz plate, and a transparent flexible material having flexibility, such as a transparent resin film and an optical resin plate, or the like can be presented. Moreover, the base material as needed with the surface process for preventing the alkaline elution and providing the gas barrier property, or the like applied can be used.

Furthermore, for improving the adhesion property between the base material surface and the above-mentioned photocatalyst containing layer, an anchor layer may be formed on the base material. As such an anchor layer, for example, a silane based or titanium based coupling agent or the like can be presented.

c. Pattern Formed Body

The pattern formed body of this embodiment is not particularly limited as long as it has the above-mentioned base material and photocatalyst containing layer. As need arises, the pattern formed body may comprise suitably a light shielding part or the like. The pattern formed body of this embodiment can be used for the production of a functional element having various functional parts, such as: the production of a color filter of forming a colored layer on the property changeable pattern, utilizing the property difference between the property changeable pattern and the other region; the production of an organic EL element of forming an organic EL layer, utilizing the property of the above-mentioned property changeable pattern; the production of a micro lens of forming a lens, utilizing the above-mentioned property difference; and the production of a wiring substrate of forming a conductive pattern, utilizing the above-mentioned property difference.

2. Second Embodiment

Next, the second embodiment for the pattern formed body of the present invention will be explained. The pattern formed body of the embodiment is a pattern formed body characterized by comprising a base material, the photocatalyst containing layer formed on the base material, and a property changeable layer formed on the photocatalyst containing layer and has the property change by the action of the photocatalyst accompanied by the energy irradiation, wherein a property changeable pattern with the property of the property changeable layer changed in a pattern is provided.

Figure 3:
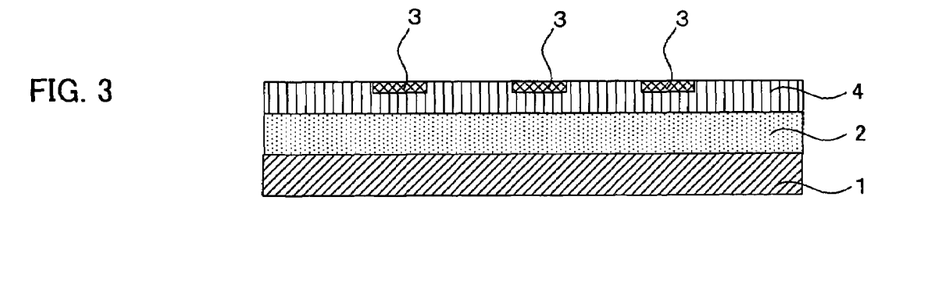
FIG. 3 is a schematic cross-sectional view showing an example of a pattern formed body of the present invention.

The pattern formed body of this embodiment, for example as shown in FIG. 3, comprises a base material 1, a photocatalyst containing layer 2 formed on the base material 1, and a property changeable layer 4 formed on the photocatalyst containing layer 2, with a property changeable pattern 3 with the property changed in a pattern formed on the above-mentioned property changeable layer 4.

According to this embodiment, since the above-mentioned photocatalyst containing layer is formed, the property of the property changeable layer can be changed by the action of the photocatalyst in the above-mentioned photocatalyst containing layer. Thus, the property changeable pattern can be formed easily without the need of a complicated process or the like.

Moreover, as mentioned above, in the case the catalytic activity of the photocatalyst in the photocatalyst containing layer is low, the pattern is thickened so that a highly precise pattern as the above-mentioned property changeable layer may not be formed. However, in this embodiment, since the activity of the photocatalyst in the photocatalyst containing layer is high, the property changeable pattern can be formed highly precisely and efficiently in a short period of time. Therefore, a high quality pattern formed body with a highly precise property changeable pattern formed can be provided.

Hereinafter, the property changeable layer used in the pattern formed body of this embodiment will be explained. Since the photocatalyst containing layer used in this embodiment is same as that explained in the item of the "B. Photocatalyst containing layer", and the base material is same as that used in the above-mentioned first embodiment, detailed explanation is omitted here.

a. Property Changeable Layer

The property changeable layer used in this embodiment is formed on the above-mentioned photocatalyst containing layer and has the property change by the action of the above-mentioned photocatalyst accompanied by the energy irradiation, and it has a property changeable pattern with the property changed in a pattern.

Here, the above-mentioned "property change by the action of the photocatalyst accompanied by the energy irradiation" denotes the property change of the surface by decomposing, modifying or the like an organic group of the surface by the active oxygen species or the like generated by the action of the photocatalyst at the time of irradiating the energy to the property changeable layer. The kind of the property change of the property changeable layer in this embodiment is not particularly limited. For example, it may be the wettability change by decomposing, modifying or the like an organic group present on the surface of the property changeable layer or the like, or the bonding property change of the surface of the property changeable layer or the like.

In this embodiment, among the above-mentioned, it is particularly preferable that the property changeable layer is a layer to have the contact angle with respect to a liquid of the surface lowered by the action of the photocatalyst accompanied by the energy irradiation. Thereby, a functional part can be formed highly precisely along the property changeable pattern, utilizing the wettability difference between the property changeable pattern and the other portion.

The property changeable layer is not particularly limited as long as it is a layer to have the property change by the action of the photocatalyst accompanied by the energy irradiation. For example, it may be a layer made of the same material as the binder in the photocatalyst containing layer of the first embodiment.

Moreover, as to the method for forming the above-mentioned property changeable pattern, it can be carried out by irradiating the energy in a pattern from a predetermined direction to the above-mentioned photocatalyst containing layer. Since the energy used for the formation of the property changeable pattern, the energy irradiation method or the like, are same as those in the above-mentioned first embodiment, detailed explanation is omitted here.

b. Pattern Formed Body

The pattern formed body of this embodiment is not particularly limited as long as it has the above-mentioned base material, photocatalyst containing layer and property changeable layer. As need arises, the pattern formed body may suitably comprise a light shielding part or the like. The pattern formed body of this embodiment can also be used for the production of a functional element having various functional parts, such as: the production of a color filter of forming a colored layer on the property changeable pattern, utilizing the property difference between the property changeable pattern and the other region; the production of an organic EL element of forming an organic EL layer, utilizing the prosperity difference of the above-mentioned property changeable pattern; the production of a micro lens of forming a lens, utilizing the above-mentioned property difference; and the production of a wiring substrate of forming a conductive pattern, utilizing the above-mentioned property difference.

D. Photocatalyst Containing Layer Side Substrate

Next, the photocatalyst containing layer side substrate of the present invention will be explained. The photocatalyst containing layer side substrate of the invention is a substrate used for forming a property changeable pattern with the property changed by the action of a photocatalyst accompanied by the energy irradiation to a counter substrate to be disposed facing thereto, characterized by comprising a base body, and the photocatalyst containing layer formed on the base body.

Figure 4:
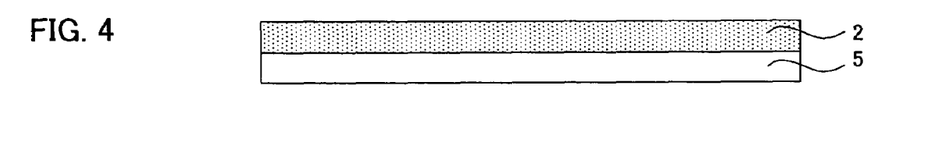
FIG. 4 is a schematic cross-sectional view showing an example of a photocatalyst containing layer side substrate of the present invention.
Figure 5A:
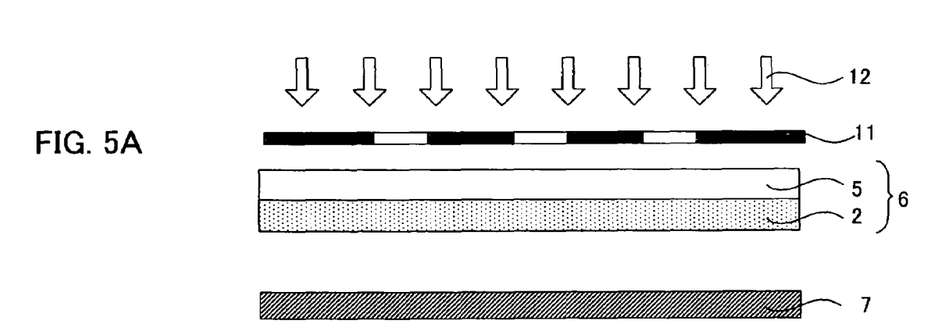
FIGS. 5A to 5B are a process diagram showing an example of a production method for a pattern formed body of the present invention.
Figure 5B:
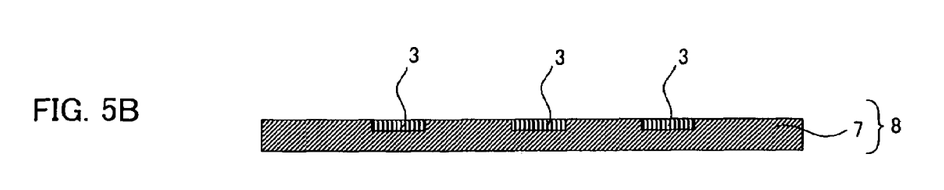

For example as shown in FIG. 4, the photocatalyst containing layer side substrate of the present invention comprises a base body 5, and a photocatalyst containing layer 2 formed on the base body 5. For example as shown in FIGS. 5A to 5B, the photocatalyst containing layer side substrate is used with a counter substrate 7 to have the property change by decomposition, modification or the like of an organic group on the surface by an active oxygen species or the like, and the photocatalyst containing layer 2 of the photocatalyst containing layer side substrate 6 facing with each other (FIG. 5A). By irradiating the energy 12 using a photo mask 11 or the like from a predetermined direction in this state, a property changeable pattern 3 with the property of the counter substrate 7 changed in a pattern is formed (FIG. 5B).

Conventionally, in the case the activity of the photocatalyst in the above-mentioned photocatalyst containing layer side substrate is low, the energy needs to be irradiated for a long period of time so that a problem is involved in that a highly precise pattern cannot be formed due to the energy spreading around or the like. However, according to the present invention, as mentioned above, since the activity of the photocatalyst in the above-mentioned photocatalyst containing layer is high so that the generation efficiency of the active oxygen species is high, the property of the counter substrate can be changed in a short period of time. Accordingly, a photocatalyst containing layer side substrate, capable of forming a highly precise pattern can be provided.

Hereinafter, the base body used in the present invention will be explained. Since the above-mentioned photocatalyst containing layer is same as that explained in the item of the "B. Photocatalyst containing layer", detailed explanation is omitted here.

a. Base Body

The base body used in the present invention will be explained. The base body used in the present invention is not particularly limited as long as the above-mentioned photocatalyst containing layer can be formed. It may be one having the flexibility, such as a resin film, or one not having the flexibility, such as a glass substrate. It can be selected suitably according to the energy irradiation method. Moreover, the energy transmission property of the above-mentioned base body can be selected suitably according to the direction of irradiating the energy to be irradiated at the time of patterning the counter substrate.

For improving the adhesion property between the base body surface and the photocatalyst containing layer, and preventing the deterioration of the base body by the action of the photocatalyst, an intermediate layer may be formed on the base body. As such an intermediate layer, a silica film produced by a silane based or titanium based coupling agent, the reactive sputtering method, the CVD method or the like can be presented.

b. Photocatalyst Containing Layer Side Substrate

Next, the photocatalyst containing layer side substrate of the present invention will be explained. The photocatalyst containing layer side substrate of the present invention is not particularly limited as long as it has the above-mentioned base body and photocatalyst containing layer. For example, it may have a light shielding part formed on the above-mentioned photocatalyst containing layer or base body, or a primer layer or the like formed on the light shielding part formed.

Moreover, the counter substrate used in the present invention is not particularly limited as long as it has the property change by the action of the photocatalyst accompanied by the energy irradiation. For example, it may be one comprising only a resin layer to have the property change by the photocatalyst accompanied by the energy irradiation, one having a property changeable layer to have the property change formed on a base material, or the like.

Here, the kind of the property change is not particularly limited. For example, it may be the wettability change by decomposing, modifying or the like an organic group present on the surface of the property changeable layer or the like, the bonding property change of the surface of the property changeable layer, or the like.

As such a counter substrate, since that having the property changeable layer or the like, explained in the second embodiment of the above-mentioned "C. Pattern formed body" can be used, detailed explanation is omitted here.

Here, the photocatalyst containing layer side substrate of the present invention is used in a state facing the counter substrate containing an organic group to be decomposed, modified or the like by the action of the photocatalyst accompanied by the energy irradiation as mentioned above. At the time, the photocatalyst containing layer side substrate is disposed and used in a state with the action of the photocatalyst substantially provided to the surface of the counter substrate or the like. In this case, in addition to a state where the two substrates are actually in a physical contact, it is preferable that the two substrates are to be disposed with a predetermined interval provided therebetween. In the case of disposing with a gap, it is preferably 200 μm or less.

In the present invention, in consideration to the points that the pattern accuracy is highly preferable, the sensitivity of the photocatalyst is high and the property change efficiency of the counter substrate or the like is preferable, such a gap is in particular in a range of 0.2 μm to 10 μm, and preferably in a range of 1 μm to 5 μm. Such a gap range is particularly effective for a counter substrate of a small area, capable of controlling the gap with a high accuracy, or the like.

On the other hand, in the case of processing a counter substrate of a large area of, for example, 300 mm×300 mm or more or the like, it is extremely difficult to form the above-mentioned minute gap between the photocatalyst containing layer side substrate and the counter electrode or the like without having the two substrates contact each other. Therefore, in the case the counter substrate or the like has a relatively large area, the above-mentioned gap is in a range of 10 to 100 μm, and in particular, it is preferably in a range of 50 to 75 μm. Since the gap is set to be in such a range, the effect of not generating irregularity in the property change or the like on the counter substrate can be achieved without the following problems: the pattern accuracy decline such as blurring of the pattern; the property change efficiency deterioration due to the deterioration of the photocatalyst sensitivity or the like.

Accordingly, in the case the photocatalyst containing layer side substrate is used at the time of exposing a counter substrate of a relatively large area or the like, it is preferable to set the gap in the positioning device for the photocatalyst containing layer side substrate and the counter substrate or the like in the energy irradiation device in a range of 10 μm to 200 μm, in particular, in a range of 25 μm to 75 μm. Since the setting value is in the range, the photocatalyst containing layer side substrate and the counter substrate or the like can be disposed without being contact to each other and without drastic decline of the pattern accuracy or drastic deterioration of the sensitivity of the photocatalyst.

Accordingly, since the photocatalyst containing layer side substrate and the surface of the counter substrate or the like are disposed with a predetermined interval provided therebetween, desorption of the active oxygen species generated by an action of the oxygen, the water and the photocatalyst can be facilitated. That is, in the case the interval between the photocatalyst containing layer side substrate and the counter substrate or the like is made narrower than the above-mentioned range, the above-mentioned desorption of the active oxygen species becomes difficult. As a result, the property change speed may be delayed, and thus it is not preferable. Moreover, in the case where they are disposed with an interval larger than the above-mentioned range, the generated active oxygen species can hardly reach to the counter substrate, and also in this case the property change speed may be delayed, and thus it is not preferable.

Such an arrangement state may be maintained at least during the energy irradiation.

Moreover, since the energy to be irradiated at the time of patterning using the above-mentioned photocatalyst containing layer side substrate is same as the energy used for the formation of the property changeable pattern explained in the first embodiment of the above-mentioned "C. Pattern formed body".

E. Production Method for a Photocatalyst Containing Layer

Next, a production method for a photocatalyst containing layer of the present invention will be explained. The production method for a photocatalyst containing layer of the invention is a production method for a photocatalyst containing layer, characterized by comprising an examination process for selecting only the photocatalyst containing layer including a portion with the signal intensity of the electron spin resonance spectrum derived from the hydroxy radical increased to 1,000 times or more in 1 second within 600 seconds of the start of the ultraviolet ray irradiation by measuring the electron spin resonance spectrum while irradiating an ultraviolet ray to a photocatalyst containing layer containing at least a photocatalyst.

According to the present invention, only a photocatalyst containing layer including a portion to have the signal intensity of the electron spin resonance spectrum derived from the hydroxy radical increased to a predetermined value or more in a predetermined time from the start of the energy irradiation at the time of measuring the electron spin resonance spectrum from the start of the energy irradiation in the above-mentioned examination process can be selected and produced. Therefore, the photocatalyst containing layer produced by the present invention has a high activity of the photocatalyst contained in the photocatalyst containing layer so that the production efficiency of the active oxygen species in a short period of time can be made higher. Therefore, by use of the photocatalyst containing layer produced by the present invention, an organic substance can be decomposed, modified or the like efficiently in a short period of time. As a result, the photocatalyst containing layer of the present invention can be used, for example, for the various applications such as patterning of a layer made of an organic substance. Moreover, since the above-mentioned examination process is carried out, the time to the activation of the photocatalyst containing layer can also be measured so that the irradiation time needed at the time of patterning using the above-mentioned photocatalyst containing layer can also be measured, and thus it is advantageous.

Hereinafter, the examination process in the present invention will be explained.

1. Examination Process

The examination process in the present invention is a process of measuring the electron spin resonance spectrum while irradiating an ultraviolet ray to a photocatalyst containing layer containing at least a photocatalyst, and selecting only the above-mentioned photocatalyst containing layer including a portion to have the intensity increasing ratio in 1 second of the electron spin resonance spectrum to a predetermined value or more in a predetermined time from the start of the above-mentioned ultraviolet ray irradiation.

In this process, it is preferable to select a photocatalyst containing layer containing a portion with the signal intensity of the electron spin resonance spectrum derived from the hydroxy radical increased to 1,000 times or more in 1 second; preferably 1,500 times or more; and in particular, 2,000 times or more within 600 seconds of the start of the energy irradiation. Thereby, the activity of the photocatalyst in the photocatalyst containing layer can be high so that a photocatalyst containing layer capable of efficiently decomposing an organic substance or the like in a short period of time can be provided.

Moreover, it is preferable to select one having the above-mentioned intensity increasing ratio to the above-mentioned value or more included within 600 seconds of the start of the energy irradiation; moreover, within 300 seconds; and in particular within 100 seconds. Thereby, one capable of activating earlier the photocatalyst containing layer can be selected so that one capable of decomposing or the like an organic substance or the like efficiently in a shorter period of time can be provided.

Here, since the calculation method of the above-mentioned intensity increasing ratio is same as the method explained in the item of the above-mentioned "A. Photocatalyst composition", detailed explanation is omitted here.

Moreover, in this process, if the produced photocatalyst containing layer can be measured as it is by the electron spin resonance measuring device, it may be measured as it is, while, it is also possible to cut out and measure a part of the produced photocatalyst containing layer, or the like. Moreover, by producing a photocatalyst containing layer for test at the same time as a photocatalyst containing layer for product under the same condition, and examining the photocatalyst containing layer for test, the photocatalyst containing layer for product may be selected. This process may be carried out either for the all produced photocatalyst containing layers, or for every several pieces of a predetermined number.

2. Others

The production method for a photocatalyst containing layer in the present invention may have not only the above-mentioned examination process but also a photocatalyst containing layer forming process for forming a photocatalyst containing layer or the like. In this case, the above-mentioned examination process is carried out after the above-mentioned photocatalyst containing layer forming process.

Moreover, a photocatalyst containing layer produced by the present invention can be used for example for the pattern formed body explained in the item of the "C. Pattern formed body", or the photocatalyst containing layer side substrate explained in the "D. Photocatalyst containing layer side substrate".

F. Production Method for a Pattern Formed Body

Next, the production method for a pattern formed body of the present invention will be explained. The production method of the invention is a production method for a pattern formed body for producing a pattern formed body: by disposing a counter substrate and a photocatalyst containing layer side substrate comprising a base body and a photocatalyst containing layer containing at least a photocatalyst formed on the base body, facing with each other; and by irradiating the energy in a pattern to form a property changeable pattern with the property changed on the counter substrate, characterized by comprising: an examination process for selecting only the photocatalyst containing layer side substrate including a portion with the signal intensity of the electron spin resonance spectrum derived from the hydroxy radical increased to 1,000 times or more in 1 second within 600 seconds of the start of the ultraviolet ray irradiation by measuring the electron spin resonance spectrum while irradiating the ultraviolet ray to the photocatalyst containing layer.

For example as shown in FIGS. 5A to 5B, the production method for a pattern formed body of the present invention is a method for producing a pattern formed body 8 having a property changeable pattern 3 by disposing the photocatalyst containing layer 2 of a photocatalyst containing layer side substrate 6 comprising a base body 5 and a photocatalyst containing layer 2 formed on the base body 5, and a counter substrate 7 which has the property change by decomposition, modification or the like of an organic group on the surface by the active oxygen species or the like, facing with each other, and irradiating the energy 12 using a photo mask 11 or the like from a predetermined direction (FIG. 5A) for changing the property of the counter substrate 7 in a pattern (FIG. 5B). Moreover, according to the present invention, an examination process of measuring the electron spin resonance spectrum while irradiating an ultraviolet ray to the above-mentioned photocatalyst containing layer for selecting only the above-mentioned photocatalyst containing layer side substrate including a portion to have the intensity increasing ratio of 1 second of the electron spin resonance spectrum to a predetermined value or more in a predetermined time period from the start of the above-mentioned ultraviolet ray irradiation is provided.

According to the present invention, in the above-mentioned examination process, only a photocatalyst containing layer side substrate including a portion to have the increasing ratio of the signal intensity of the electron spin resonance spectrum derived from the hydroxy radical to a certain level or more at the time of measuring the electron spin resonance spectrum of the photocatalyst containing layer can be selected. Therefore, according to the present invention, a pattern formed body having a highly precise property changeable pattern can be formed by carrying out the production of the pattern formed body efficiently in a short period of time, using only the photocatalyst containing layer side substrate capable of decomposing, modifying or the like an organic substance efficiently in a short period of time with a high activity. Moreover, since the above-mentioned photocatalyst containing layer side substrate is used repeatedly in general, by carrying out the above-mentioned examination process, the timing for abandoning the photocatalyst containing layer side substrate deteriorated according to the time passage or the like, can be measured. Consequently, it is also advantageous in that a pattern formed body can be produced using only the photocatalyst containing layer side substrate having a high activity. Hereinafter, the examination process in the present invention will be explained.

1. Examination Process

The examination process in the present invention is a process of measuring the electron spin resonance spectrum while irradiating an ultraviolet ray to a photocatalyst containing layer containing at least a photocatalyst, and selecting only the above-mentioned photocatalyst containing layer including a portion to have the intensity increasing ratio derived from the hydroxy radical in 1 second of the electron spin resonance spectrum to a predetermined value or more in a predetermined time from the start of the above-mentioned ultraviolet ray irradiation.

In this process, it is preferable to select the photocatalyst containing layer side substrate comprising a photocatalyst containing layer containing a portion with the signal intensity of the electron spin resonance spectrum derived from the hydroxy radical increased to 1,000 times or more in 1 second; more preferably 1,500 times or more; and particular preferably, 2,000 times or more, within 600 seconds of the start of the energy irradiation. Thereby, the activity of the photocatalyst in the photocatalyst containing layer can be high so that a photocatalyst containing layer side substrate capable of efficiently changing the property of the counter substrate in a short period of time can be provided.

Moreover, it is preferable to select one having the above-mentioned intensity increasing ratio to the above-mentioned value or more included within 600 seconds of the start of the energy irradiation; more preferably, within 300 seconds; and particular preferably within 100 seconds. Thereby, one capable of activating earlier the photocatalyst containing layer can be selected so that one capable of changing the property of the counter substrate efficiently in a shorter period of time can be provided.

Here, since the calculation method of the above-mentioned intensity increasing ratio is same as the method explained in the item of the above-mentioned "A. Photocatalyst composition", detailed explanation is omitted here.

Moreover, in this process, if the photocatalyst containing layer can be measured as it is by the electron spin resonance measuring device, it may be measured as it is, while it is also possible to, for example, cut out and measure a part of the photocatalyst containing layer. Moreover, by producing a photocatalyst containing layer side substrate for test at the same time as a photocatalyst containing layer side substrate for pattern formation under the same condition, and examining the photocatalyst containing layer of the photocatalyst containing layer side substrate for test, the photocatalyst containing layer side substrate for pattern formation may be selected. This process may either be carried out for the all photocatalyst containing layer side substrates to be used for the pattern formed body production, or random checking.

2. Others

The production method for a pattern formed body in the present invention may have not only the above-mentioned examination process but also a photocatalyst containing layer side substrate forming process for forming a photocatalyst containing layer side substrate, an energy irradiation process for irradiating the energy in a pattern with the photocatalyst containing layer side substrate and the counter substrate face with each other, or the like. In this case, the above-mentioned examination process may be carried out immediately after the above-mentioned photocatalyst containing layer side substrate forming process, right before carrying out the above-mentioned energy irradiation process, or the like. Moreover, the above-mentioned examination process may be carried out regularly, for example, for the stored photocatalyst containing layer side substrates.

A photocatalyst containing layer to be used in the present invention can be same as the photocatalyst containing layer side substrate explained for example in the "D. Photocatalyst containing layer side substrate", and the above-mentioned energy irradiation process can be same as the energy irradiation method explained in the "D. Photocatalyst containing layer side substrate", thus detailed explanation is omitted here. Moreover, also the counter substrate used in the present invention can be same as the photocatalyst containing layer side substrate explained for example in the "D. Photocatalyst containing layer side substrate", detailed explanation is omitted here.

The present invention is not limited to the embodiments. The embodiments are merely examples, and any one having the substantially same configuration as the technological idea disclosed in the claims of the present invention and the same effects is included in the technological scope of the present invention.

EXAMPLES

Hereinafter, with reference to the examples, the present invention will be explained more specifically.

Example 1

A dispersion liquid of a photocatalyst composition was prepared by mixing 3 g of an isopropyl alcohol, 0.1 g of a tetraethoxy silane and 0.5 g of a titanium oxide sol solution (product name: STK-01, manufactured by ISHIHARA SANGYO KAISHA, LTD.) and agitating at 100° C. for 30 minutes. A 0.1 μm thickness photocatalyst containing layer was formed by coating the prepared dispersion liquid on a washed non alkaline glass substrate of a 0.7 mm thickness by the spin coating method and heating at 150° C. for 60 minutes.

Figure 6:
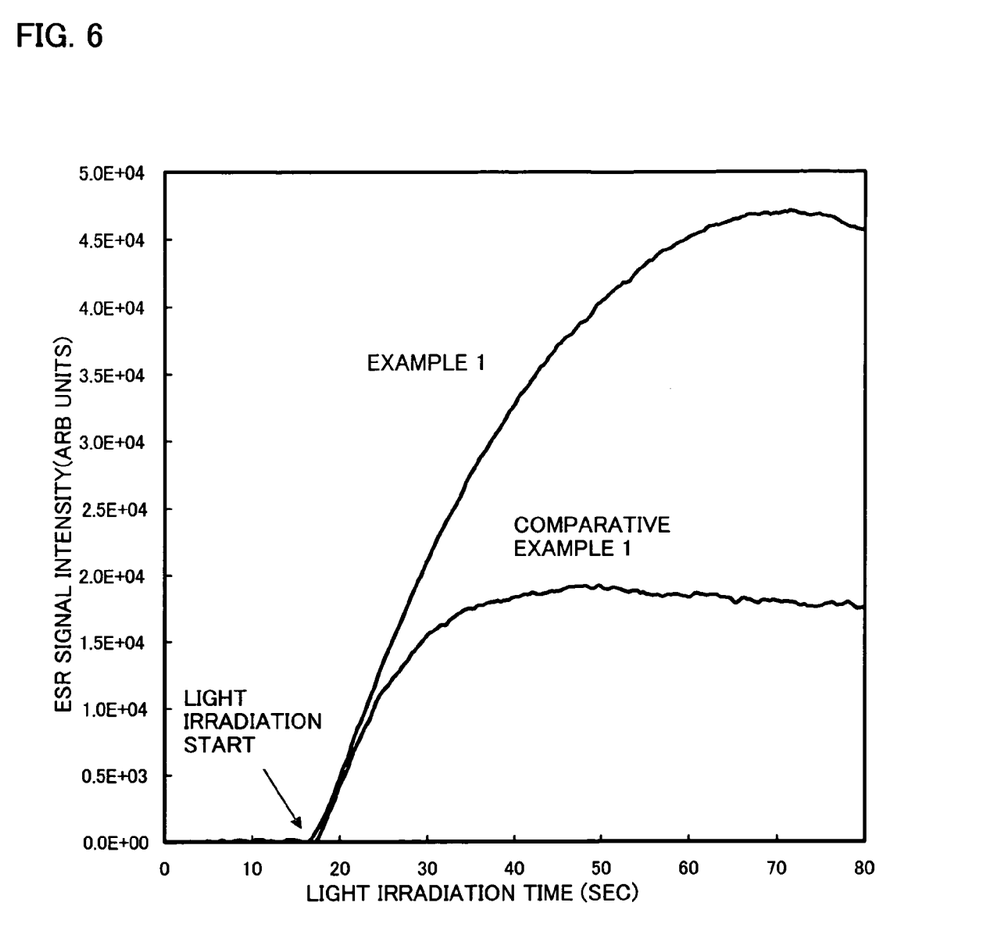
FIG. 6 is a graph showing the relationship between the light irradiation time and the signal intensity of the electron spin resonance derived from the hydroxy radical for the example 1 and the comparative example 1 of the present invention.
Figure 7:
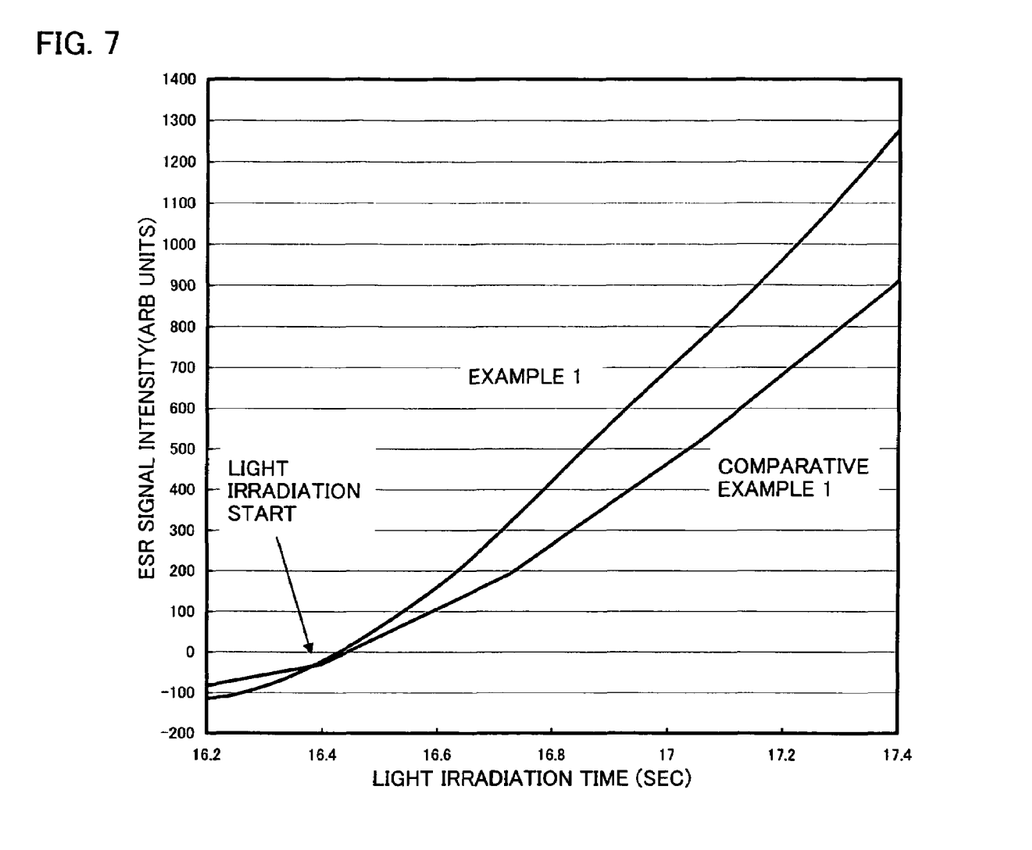
FIG. 7 is a graph showing the relationship between the light irradiation time and the signal intensity of the electron spin resonance derived from the hydroxy radical for the example 1 and the comparative example 1 of the present invention immediately after the start of the light irradiation.

The electron spin resonance spectrum measurement was carried out while irradiating an ultraviolet ray of a high pressure mercury lamp for the photocatalyst containing layer by spin trapping. A graph showing the relationship between the light irradiation time and the signal intensity of the electron spin resonance derived from the hydroxy radical is shown in FIG. 6. Moreover, a graph showing the relationship between the light irradiation time immediately after the start of the light irradiation and the signal intensity of the electron spin resonance derived from the hydroxy radical is shown in FIG.

7. Thereby, it was confirmed that the electron resonance spectrum signal intensity derived from the hydroxy radical was raised to 1,300 times between 1 second to 2 seconds after the start of the exposure of the hydroxy radical.

Example 2

Based on the dispersion liquid composition described in the example 1, a dispersion liquid of a photocatalyst composition having the wettability changing properties was prepared by mixing 3 g of an isopropyl alcohol, 0.1 g of a tetraethoxy silane, 0.5 g of a titanium oxide sol solution (product name: STK-01, manufactured by ISHIHARA SANGYO KAISHA, LTD.), and furthermore, 0.005 g of a fluoroalkylsilane for providing the wettability changing properties, and agitating at 100° C. for 30 minutes. A 0.12 μm thickness photocatalyst containing layer having the wettability changing properties was obtained by coating the prepared dispersion liquid onto a washed non alkaline glass substrate of a 0.7 mm thickness by the spin coating method and heating at 150° C. for 60 minutes.

As a result of the contact angle measurement with respect to the wetting index reference solution of 40 mN/m of the photocatalyst containing layer by a contact angle measuring device (CA-Z type manufactured by Kyowa Interface Science, Co., Ltd.), it was 55 degrees.

As a result of the ultraviolet ray irradiation by a 20 mW/cm$^2$ (365 nm) illuminance by an ultrahigh pressure mercury lamp to the surface of the photocatalyst containing layer, it took 85 seconds until the contact angle with respect to the wetting index reference solution of 40 mN/m became 5 degrees or less.

Comparative Example 1

A 0.1 μm thickness photocatalyst containing layer was obtained in the same manner as in the example 1 except that the time for agitating the dispersion liquid was changed to 5 minutes.

The electron spin resonance spectrum measurement was carried out while irradiating an ultraviolet ray of a high pressure mercury lamp for the photocatalyst containing layer by spin trapping. A graph showing the relationship between the light irradiation time and the signal intensity of the electron spin resonance derived from the hydroxy radical is shown in FIG. 6. Moreover, a graph showing the relationship between the light irradiation time immediately after the start of the light irradiation and the signal intensity of the electron spin resonance derived from the hydroxy radical is shown in FIG. 7. Thereby, it was confirmed that the electron resonance spectrum signal intensity derived from the hydroxy radical was raised to 900 times between 1 second to 2 seconds after the start of the exposure.

Comparative Example 2

A 12 μm thickness photocatalyst containing layer having the wettability changing properties was obtained in the same manner as in the example 2 except that the time for agitating the dispersion liquid was changed to 5 minutes based on the agitating time described in the comparative example 1.

As a result of the contact angle measurement with respect to the wetting index reference solution of 40 mN/m of the photocatalyst containing layer by a contact angle measuring device (CA-Z type manufactured by Kyowa Interface Science, Co., Ltd.), it was 50 degrees.

As a result of the ultraviolet ray irradiation by a 20 mW/cm$^2$ (365 nm) illuminance by an ultrahigh pressure mercury lamp to the surface of the photocatalyst containing layer, it took 160 seconds until the contact angle with respect to the wetting index reference solution of 40 mN/m became 5 degrees or less.

EVALUATION

Since the dispersion state of the photocatalyst was better in the examples 1 and 2 than in the comparative examples 1 and 2, it was confirmed that the active oxygen generation efficiency was improved. Furthermore, shortening of the required exposure time was enabled.

What is claimed is:

1. A production method for a photocatalyst containing layer comprising an examination process for selecting only a photocatalyst containing layer including a portion which increases a signal intensity of an electron spin resonance spectrum derived from a hydroxy radical to 1,000 times or more in 1 second within 600 seconds of a start of an irradiation of an ultraviolet ray by measuring the electron spin resonance spectrum while irradiating the ultraviolet ray to the photocatalyst containing layer containing at least a photocatalyst.

2. A production method for a pattern formed body for producing a pattern formed body: by disposing a counter substrate and a photocatalyst containing layer side substrate which comprises a base body and a photocatalyst containing layer containing at least a photocatalyst formed on the base body, facing with each other; and by irradiating an energy in a pattern to form a property changeable pattern in which a property is changed on the counter substrate, wherein an examination process for selecting only the photocatalyst containing layer side substrate including a portion which increases a signal intensity of an electron spin resonance spectrum derived from a hydroxy radical to 1,000 times or more in 1 second within 600 seconds of a start of an irradiation of an ultraviolet ray by measuring the electron spin resonance spectrum while irradiating the ultraviolet ray to the photocatalyst containing layer is comprised.

3. The production method for photocatalyst containing layer according to claim 1, wherein the examination process for selecting only a photocatalyst containing layer further comprises processes of:

setting the photocatalyst containing layer and a radical trapping agent in an electron spin resonance measuring device, and measuring an electron spin resonance spectrum derived from a hydroxy radical while irradiating the ultraviolet ray to the photocatalyst containing layer set in the electron spin resonance measuring device.

4. The production method for a pattern formed body for producing a pattern formed body according to claim 2, wherein the examination process for selecting only the photocatalyst containing layer side substrate further comprises processes of:

setting the photocatalyst containing layer and a radical trapping agent in an electron spin resonance measuring device, and measuring an electron spin resonance spectrum derived from a hydroxy radical while irradiating the ultraviolet ray to the photocatalyst containing layer set in the electron spin resonance measuring device.

5. The production method for a photocatalyst containing layer according to claim 1, wherein the photocatalyst containing layer further comprises a binder and a photocatalyst activity improving additive.

6. The production method for a pattern formed body for producing a pattern formed body according to claim 2, wherein the photocatalyst containing layer further comprises a binder and a photocatalyst activity improving additive.

* * * * *